June 15, 1948.

G. S. WILLIAMSON 2,443,526

QUICK-ACTION CHUCK

Filed Aug. 15, 1944

Inventor
GARLAND STANTON WILLIAMSON

By

Attorney

June 15, 1948.  G. S. WILLIAMSON  2,443,526
QUICK-ACTION CHUCK

Filed Aug. 15, 1944  2 Sheets-Sheet 2

GARLAND STANTON WILLIAMSON Inventor

By

Attorney

Patented June 15, 1948

2,443,526

UNITED STATES PATENT OFFICE 2,443,526

QUICK-ACTION CHUCK

Garland Stanton Williamson, Santa Monica, Calif., assignor to The Garrett Corporation, Airesearch Manufacturing Company division, Los Angeles, Calif., a corporation of California Application August 15, 1944, Serial No. 549,503

6 Claims. (Cl. 279—110)

This invention relates to chucks, such as employed for holding work in a machine tool, and while the invention can be applied in various situations, in the present specification it is described as applied at the location of the face plate or rotary head of a lathe.

An object of the invention is to provide a chuck of this class which is of simple construction, and which can be operated expeditiously to clamp a piece of work in a fixed position with respect to the axis of rotation of the machine tool to facilitate the performance of cutting operations upon the work, the general purpose being to eliminate the very considerable time which is consumed ordinarily in clamping up a piece of work on the face plate of a lathe. In this connection, it should be understood that where a piece of work is to be finished on a lathe, if the shape of the work is such that it cannot be readily mounted in a lathe chuck, it is the customary practice to clamp the work up on the face plate of the lathe head through the agency of clamping bolts with T heads inserted through the slots in the rotary head. These operations consume a considerable amount of time, and great care must be taken to insure that the work will be properly centered and aligned with respect to the axis of rotation of the lathe face plate.

The present invention eliminates much of this time.

Another object of the invention is to provide a chuck of this character having improved features of construction which will insure that when a piece of work is put in position, it will be properly centered and held against movement by the torque exerted by the cutting tool in removing material from the work.

One of the objects of the present invention is to provide a chuck of this character peculiarly adapted for performing the same operation upon pieces of work which are alike; in other words, to provide a device of this character which will facilitate the performance of a multiple or series of different operations upon unfinished blanks or pieces of work, and which will greatly reduce the time consumed in the operations of setting up the work in position and clamping it in the machine ready to have the finishing operations performed upon it.

A further object of the invention is to provide a chuck of this character adapted to be employed as an attachment for a machine tool having the general character of an ordinary lathe.

A further object of the invention is to provide a chuck of this character particularly adapted for use as an attachment for a machine tool having the general character of a lathe and to provide the chuck with control means for effecting the quick release of the finished work and the quick securing of the next piece of work which is to have machine operations performed upon it.

In a common type of lathe, bar stock is fed from time to time so that it passes to the front of the lathe chuck through a central opening in the chuck. One of the objects of the invention is to provide a chuck construction particularly adapted for installation in such a lathe, and in such a way that the lever of the lathe which ordinarily controls this stock-feed can be utilized to control this chuck.

Other objects and advantages will appear from the specification and from the drawing, which is illustrative of a form of device in which the invention may be employed.

In the drawings:

Fig. 1 is a side elevation of a machine tool of this character of a lathe, to which my invention is applied, a portion of the housing of the machine being broken away so as to illustrate how the parts constituting my invention are installed in a machine of this character; this view also shows the parts of my invention generally in cross section, and illustrates how the device operates to clamp the work in position.

Figure 1:
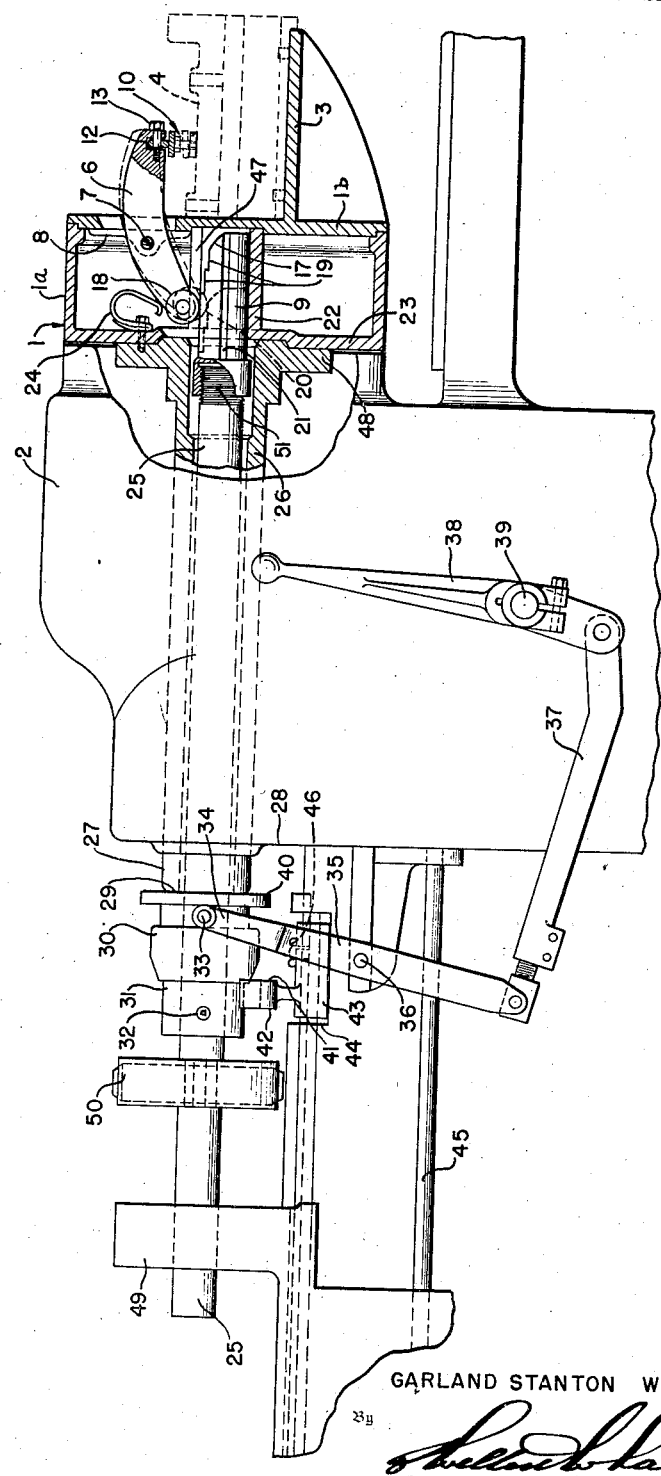

Referring to Fig. 1, in the practice of the invention I provide a rotary head 1 which is mounted for rotation in a housing 2 of a machine tool such as a lathe, which provides a rotary drive for the head. This rotary head 1 preferably includes a body 1a and a removable cover 1b which may be one of a plurality of interchangeable heads, each head being adapted for use with a different kind of part or different sizes of a part to be finished in the machine tool.

In the present instance, the cover 1b is provided with an outwardly projecting extension or rest 3, which operates as a seat for the work 4 indicated in dotted outline. Suppose, for example, that this piece of work 4 must have a bore 5 (see Fig. 3) which is to be drilled or bored out to a finished diameter. In this case, of course, the work 4 must be mounted on the rest 3 with the axis of this bore in line with the axis of rotation on which the rotary head 1 is mounted in the machine housing 2. When the work 4 is put in place, its forward end, that is to say, the end disposed toward the cover 1b, should be held against the outer face of this cover, and the work 4 is then held securely against the rest or seat 3 by clamping means which preferably includes a lever 6 mounted to rock on a pivot pin 7 mounted in bearings 8 on the inner side of the cover 1b. The axis of this pivot pin 7 is of course at right angles to the radial plane in which the lever 6 rocks.

Figure 3:
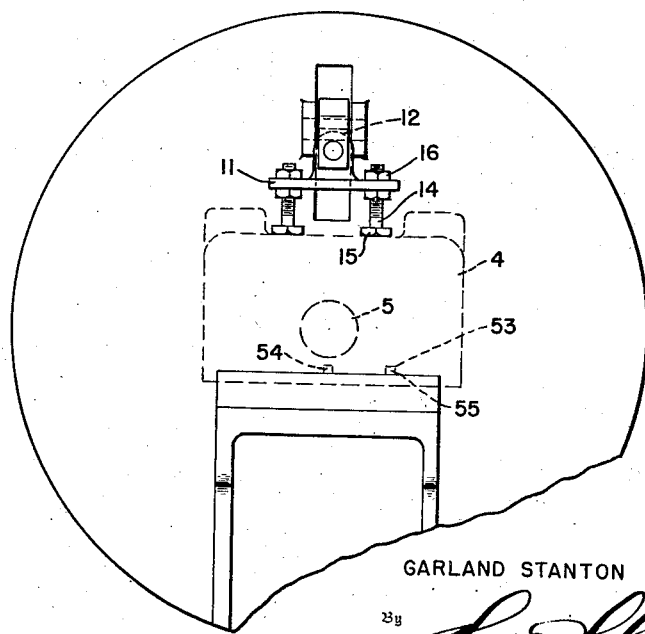
Fig. 3 is a front elevation and shows the apparatus illustrated in Fig. 2 as viewed from the plane on the line 3—3 of Fig. 2; in this view a portion of the rotary head is broken away.

This means is actuated by a part which is movable longitudinally on the axis of the rotary head 1, and in the present instance this consists of a plunger 9 having cam means for engaging the inner end of the lever 6 to force the same outwardly, thereby causing the clamping head 10, carried on the outer end of the lever 6, to clamp down upon the side of the work 4 opposite the seat or rest 3. This clamping head preferably is in the form of a bar or cross-head 11 (see Fig. 3), the middle portion of which is formed with an upwardly extending ear 12 (see Fig. 1) which extends up into a slot in the under side of the lever, and in which it is secured by a bolt 13. This crosshead 11 extends transversely to the machine, as illustrated in Fig. 3, and is provided with two adjustable feet 14 preferably in the form of bolts having heads 15 at their lower ends, and passing loosely through their corresponding openings in the cross-head 11. The threads of these bolts are provided with nuts 16 applied above and below the cross-head 11 so as to enable them to be clamped up against the cross-head in any desired adjusted position. When the feet 14 clamp down against the work 4, the bolt 13 affords an axis of rotation so as to insure that the pressure of the two feet against the work will be equalized.

In practice, a plurality of different interchangeable plungers would be provided, because this plunger must be adapted to hold the clamping head 10 in different positions, depending upon the shape or design or character of machine operations which must be performed upon the work 4. For this reason I prefer to attach this plunger removably upon the forward end of a rod 25 which is guided to slide longitudinally in the machine on the axis of rotation of the rotary head 1. For this purpose the rod 25 is housed in a long tube or sleeve 26, the rear end 27 of which projects beyond the rear end 28 of the housing 2, and the rear end face 29 of this sleeve operates as a stop for the forward movement of a grooved shifting collar 30, the hub 31 of which is secured by a set screw 32 to the rod or bar 25. The grooved shifting collar 30 is engaged by anti-friction rollers carried on two pins 33 on the forks 34 of a shifting lever 35, which lever is pivotally mounted on a pin 36 and connected up by an adjustable link 37 to the short arm of an operating lever or handle 38. This lever extends up at the side of the housing, where it is mounted on a suitable pivot pin 39. This lever assembly is present in most lathes and is for operating the stock feed.

In order to provide a stop for the grooved collar 30 to hold the plunger 9 in its extreme withdrawn position, the forward end of this collar 30 is formed with an annular flange 40 of slightly larger diameter than the body of the collar 30, and when the collar 30 is in its rearmost position, this flange 40 will engage the forward face 41 of a yoke 42 that is carried on a block or bracket 43 adapted to be adjustably mounted in a socket 44. This socket is formed in an extension 45 projecting out from the rear side of the housing 2. This block 43 carrying the yoke 42 may be secured in any adjusted position by the clamping bolt 46. This will give a certain amount of forward and backward adjustment to regulate the position of the block in the socket 44.

Referring again to the rotary head 1, of course it is necessary to provide the sleeve 22 with a longitudinal slot 47 to provide clearance for the roller 18 to engage the stepped faces of the cam, including the faces 17, 19, and 20.

The rear wall 23 of the rotary head 1 is of course secured rigidly to the forward flange 48 that is formed integrally on the guide tube or sleeve 26.

The rear end of the plunger rod 25 is guided to rotate and slide in a bearing 49 and may be formed integrally with a housing extension 45.

Any suitable means may be employed for rotating the plunger rod 25 and in the present instance this is accomplished by providing the gear wheel 50 keyed on the bar 25, and the teeth of this gear wheel mesh with a long driving pinion or gear wheel at the side of the machine tool, which is not illustrated. This driving pinion or gear wheel would be rotated by an electric motor or other suitable means.

Whatever direction of rotation is imparted to the plunger bar 25 by this gear should be in a direction to tighten the thread connection 51 that connects the forward end of this bar to the rear end of the plunger 9. This is occasioned by reason of the fact that the rotary movement is imparted through the key or keys 21 to the rotary head and to the sleeve 26 which rotates with the head and which is suitably mounted in bearings not illustrated in the housing 2.

Figure 2:
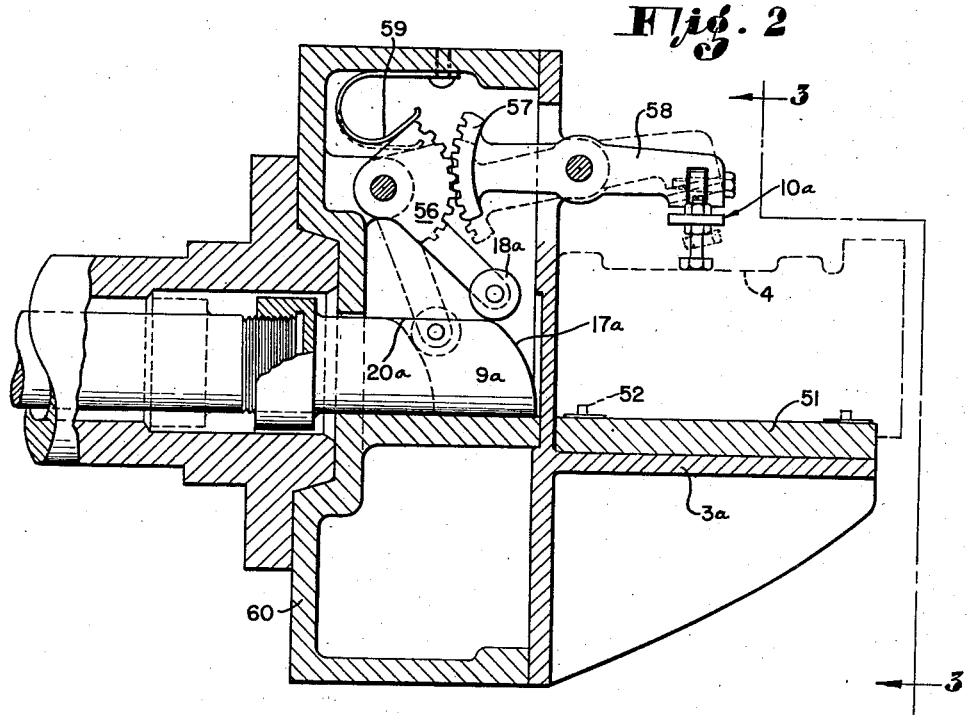
Fig. 2 is a fragmentary view illustrating parts corresponding to those shown in Fig. 1, but this view illustrates a modification of the means for actuating the clamp which secures the work in position.

In practice, it is preferable for the seat or rest 3a (see Fig. 2) located in a position far enough from the axis of rotation to permit the use of interchangeable liner seats or jig seats 51, and this seat 51 is preferably provided with interlocking means for interlocking with the work 4 so as to assist in aligning it properly with the axis of rotation of the rotary head and also to absorb the torque due to the action of the tool in taking the cut on the work. This is illustrated in Fig. 2, where the work is assumed to have a socket 52 located in a radial plane passing through the axis of the work, and is also assumed to have a second socket 53 located in a lateral position with respect to this radial plane. In such a case the special seat 51 would have a stud or dowel 54 to be received in the socket 52, and another dowel or stud 55 to be received in the other socket. It is not essential, however, that one of these dowels be in a radial plane, but it is advantageous to have it so because in that case this single dowel 54 would operate to insure the proper centering of the inner end of the work 4 that is held against the outer face of the cover.

In Fig. 2 I illustrate another embodiment of the means for actuating the clamping head 10a from the plunger 9a. In the present instance the plunger 9a does not have a cam with a succession of faces, but is represented as having a single cam face 11a which extends all the way up to the outer face 20a of the plunger.

When this plunger 9a is moved forwardly, the cam roller 18a rides up onto the face 20a and rotates a toothed segment 56, the teeth of which mesh with a segment 57 that is rigid with the forward lever arm 58 that carries the clamping head 10a. In this instance a spring, such as the spring 59, is provided on the interior of the rotary head 60 to hold the segment 56 normally in an inward or depressed position, which of course would hold the clamping lever 58 in an "elevated" or radially outward position, as it should be.

It will be evident that a piece of work to be machined can be very quickly set up in this chuck in a succession of different positions to facilitate performing multiple operations upon it. In this way, it saves much time as compared with the present practice of clamping the work by means of bolts and clamping plates secured or on the face plate of the lathe. It is also very advantageous as compared with an ordinary universal chuck because in such a chuck each jaw must grip the part to be machined at a point which is the same distance from the axis as all of the other jaws; in other words, such a chuck is adapted merely for holding a cylindrical part in alignment with the axis of rotation of the chuck.

I claim as my invention:

1. In an attachment for a rotary machine tool having a housing for carrying a rotary head for rotation on an axis, and having manually operated means for feeding rod stock forward into the machine tool on the said axis of rotation, the combination of: a sleeve for insertion in the housing on said axis; a rotary head rotatably mounted at the forward end of said sleeve; clamping means movably mounted on said rotary head for clamping work in front of said rotary head; a plunger guided to move co-axially in said head operatively connected with said clamping means for actuating the same when the plunger is shifted longitudinally within the sleeve; a rod operatively connected with the plunger for moving the same; and means for connecting the rod with the said manually operated stock feed.

2. In a chuck for clamping the work in a machine tool, the combination of: a rotary head having a seat for the work projecting forwardly therefrom; movable clamping means cooperating with the seat to clamp the work thereupon; means mounted for longitudinal movement on the axis of rotation of said rotary head for actuating the clamping means to clamp the work; an inner interlocking stud and socket connecting means between the work and the seat, located substantially in a radial plane through the said axis of rotation and near the rotary head, for centering the work with respect to said axis of rotation; and a second interlocking connection between the work and the seat located remote from the rotary head and in a lateral position with respect to the first named radial plane.

3. In a chuck for clamping the work in a machine tool, the combination of: a rotary head supported for rotation about an axis; clamping means projecting forwardly from said head, including a movable clamp having means for clamping against the work for securing the same in a fixed position, said clamping means including a plurality of adjustable feet adapted to engage the work.

4. In a chuck for clamping the work in a machine tool, the combination of: a rotary head supported for rotation about an axis; clamping means projecting forwardly from said head, including a movable clamp having means for clamping against the work for securing the same in a fixed position, including a pivoted cross-head adapted to engage the work.

5. The invention defined by claim 4, wherein the cross-head has a plurality of adjustable feet adapted to engage the work.

6. In an attachment for a rotary machine tool having a housing for carrying a rotary head for rotation on an axis, and having means for feeding rod stock forward into the machine tool on the said axis of rotation, the combination of: a sleeve for insertion in the housing on said axis; a rotary head rotatably mounted at the forward end of said sleeve; clamping means movably mounted on said rotary head for clamping work in front of said head; a plunger guided to move coaxially in said head operatively connected with said clamping means for actuating the same when the plunger is shifted longitudinally within the sleeve; a rod operatively connected with the plunger for moving the same; and means for connecting the rod with said stock feeding means for operation thereby.

GARLAND STANTON WILLIAMSON.

REFERENCES CITED

The following references are of record in the file of this patent:

UNITED STATES PATENTS

| Number | Name | Date |
|---|---|---|
| 385,474 | Muller | July 3, 1888 |
| 547,643 | Krug | Oct. 8, 1895 |
| 639,944 | Scott | Dec. 26, 1899 |
| 2,250,632 | Groene | July 29, 1941 |
| 2,357,062 | Stoll | Aug. 29, 1944 |